(12) United States Patent
Kimberly et al.

(10) Patent No.: US 9,237,022 B2
(45) Date of Patent: *Jan. 12, 2016

(54) USE OF MULTIPLE DIGITAL SIGNATURES AND QUORUM RULES TO VERIFY AIRCRAFT INFORMATION

(71) Applicant: The Boeing Company, Chicago, IL (US)

(72) Inventors: Greg A. Kimberly, Seattle, WA (US); Ian Gareth Angus, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/888,730

(22) Filed: May 7, 2013

(65) Prior Publication Data

US 2014/0337630 A1    Nov. 13, 2014

(51) Int. Cl.
| | |
|---|---|
| *H04L 29/06* | (2006.01) |
| *H04L 9/32* | (2006.01) |
| *G06F 21/57* | (2013.01) |
| *G06F 21/64* | (2013.01) |
| *H04L 9/00* | (2006.01) |

(52) U.S. Cl.
CPC .............. *H04L 9/3281* (2013.01); *G06F 21/57* (2013.01); *G06F 21/64* (2013.01); *H04L 9/006* (2013.01); *H04L 9/3268* (2013.01); *H04L 2209/84* (2013.01)

(58) Field of Classification Search
CPC . H04L 63/00; H04L 63/0823; H04L 63/0807; H04L 9/3268; H04L 9/006; H04N 21/8358; G06F 21/05; G06F 21/64

USPC .......................................................... 713/176
See application file for complete search history.

(56) References Cited

U.S. PATENT DOCUMENTS

| | | | |
|---|---|---|---|
| 3,748,597 | A | 7/1973 | Reinhart |
| 4,216,168 | A | 8/1980 | Evans et al. |
| 6,044,323 | A | 3/2000 | Yee et al. |
| 6,047,165 | A | 4/2000 | Wright et al. |
| 6,173,230 | B1 | 1/2001 | Camus et al. |
| 6,181,992 | B1 | 1/2001 | Gurne et al. |
| 6,313,759 | B1 | 11/2001 | Musland-Sipper |
| 6,385,513 | B1 | 5/2002 | Murray et al. |
| 6,438,468 | B1 | 8/2002 | Muxlow et al. |
| 6,529,706 | B1 | 3/2003 | Mitchell |

(Continued)

FOREIGN PATENT DOCUMENTS

| | | |
|---|---|---|
| EP | 1879122 A1 | 1/2008 |
| WO | WO2009070655 A1 | 6/2009 |
| WO | WO2009082592 A2 | 7/2009 |

OTHER PUBLICATIONS

Office action dated Dec. 4, 2014 regarding U.S. Appl. No. 13/888,747, 46 pages.

(Continued)

*Primary Examiner* — Eleni Shiferaw
*Assistant Examiner* — David Massie
(74) *Attorney, Agent, or Firm* — Yee & Associates, P.C.

(57) ABSTRACT

A method and apparatus for verifying data for use on an aircraft. A plurality of digital certificates associated with the data is received by a processor unit. The processor unit verifies the data for use on the aircraft using a selected number of the plurality of digital certificates.

14 Claims, 6 Drawing Sheets

(56) References Cited

U.S. PATENT DOCUMENTS

| | | | |
|---|---|---|---|
| 6,671,589 B2 | 12/2003 | Holst et al. | |
| 6,741,841 B1 | 5/2004 | Mitchell | |
| 6,748,597 B1 | 6/2004 | Frisco et al. | |
| 6,795,758 B2 | 9/2004 | Sinex | |
| 6,816,728 B2 | 11/2004 | Igloi et al. | |
| 6,816,762 B2 | 11/2004 | Hensey et al. | |
| 6,831,912 B1 | 12/2004 | Sherman | |
| 6,898,492 B2 | 5/2005 | de Leon et al. | |
| 7,103,317 B2 | 9/2006 | Chang et al. | |
| 7,151,985 B2 | 12/2006 | Tripmaker | |
| 7,167,704 B2 | 1/2007 | Chang et al. | |
| 7,203,596 B2 | 4/2007 | Ledingham et al. | |
| 7,219,339 B1 | 5/2007 | Goyal et al. | |
| 7,230,221 B2 | 6/2007 | Busse et al. | |
| 7,292,579 B2 | 11/2007 | Morris | |
| 7,313,143 B1 | 12/2007 | Bruno | |
| 7,356,389 B2 | 4/2008 | Holst et al. | |
| 7,412,291 B2 | 8/2008 | Judd et al. | |
| 7,420,476 B2 | 9/2008 | Stiffler | |
| 7,437,715 B2 | 10/2008 | Chatsinchai et al. | |
| 7,516,168 B2 | 4/2009 | LeCrone et al. | |
| 7,555,657 B2 | 6/2009 | Nasu | |
| 7,636,568 B2 | 12/2009 | Gould et al. | |
| 7,653,212 B2 | 1/2010 | Haughawout et al. | |
| 7,703,145 B2 | 4/2010 | Stelling et al. | |
| 7,720,975 B2 | 5/2010 | Erickson | |
| 7,734,740 B2 | 6/2010 | To | |
| 7,747,531 B2 | 6/2010 | Cronce | |
| 7,756,145 B2 | 7/2010 | Kettering et al. | |
| 7,876,259 B2 | 1/2011 | Schuchman | |
| 7,904,608 B2 | 3/2011 | Price | |
| 7,908,042 B2 | 3/2011 | Brinkley et al. | |
| 7,974,939 B2 | 7/2011 | Nanjangud Bhaskar et al. | |
| 8,027,758 B2 | 9/2011 | Ferro et al. | |
| 8,055,396 B2 | 11/2011 | Yates et al. | |
| 8,090,525 B2 | 1/2012 | Villiers | |
| 8,091,858 B2 | 1/2012 | Janich et al. | |
| 8,165,930 B2 | 4/2012 | Harnish et al. | |
| 8,185,254 B2 | 5/2012 | Brinkman | |
| 8,185,609 B2 | 5/2012 | Fuchs et al. | |
| 8,442,751 B2 | 5/2013 | Kimberly et al. | |
| 2001/0056316 A1 | 12/2001 | Johnson et al. | |
| 2002/0035416 A1 | 3/2002 | De Leon | |
| 2002/0111720 A1 | 8/2002 | Holst et al. | |
| 2003/0003872 A1 | 1/2003 | Brinkley et al. | |
| 2003/0109973 A1 | 6/2003 | Hensey et al. | |
| 2003/0135732 A1* | 7/2003 | Vaha-Sipila | 713/156 |
| 2003/0149670 A1 | 8/2003 | Cronce | |
| 2003/0188303 A1 | 10/2003 | Barman et al. | |
| 2003/0191559 A1 | 10/2003 | Chatsinchai et al. | |
| 2003/0191773 A1 | 10/2003 | Alexander | |
| 2003/0203734 A1 | 10/2003 | Igloi et al. | |
| 2003/0225492 A1 | 12/2003 | Cope et al. | |
| 2003/0233178 A1 | 12/2003 | Sinex | |
| 2004/0049609 A1 | 3/2004 | Simonson et al. | |
| 2004/0106404 A1 | 6/2004 | Gould et al. | |
| 2004/0128326 A1 | 7/2004 | LeCrone et al. | |
| 2004/0243994 A1 | 12/2004 | Nasu | |
| 2005/0065670 A1 | 3/2005 | Tripmaker | |
| 2005/0235340 A1 | 10/2005 | To | |
| 2005/0286452 A1 | 12/2005 | Hardgrave et al. | |
| 2006/0156053 A1 | 7/2006 | Judd et al. | |
| 2006/0164261 A1 | 7/2006 | Stiffler | |
| 2006/0229772 A1 | 10/2006 | McClary | |
| 2006/0236098 A1* | 10/2006 | Gantman et al. | 713/158 |
| 2006/0236111 A1* | 10/2006 | Bodensjo et al. | 713/176 |
| 2006/0245431 A1 | 11/2006 | Morris et al. | |
| 2006/0265110 A1 | 11/2006 | Ferro | |
| 2006/0284050 A1 | 12/2006 | Busse et al. | |
| 2007/0027589 A1 | 2/2007 | Brinkley et al. | |
| 2007/0112479 A1 | 5/2007 | Wright et al. | |
| 2007/0114280 A1 | 5/2007 | Coop et al. | |
| 2007/0126621 A1 | 6/2007 | Sandell et al. | |
| 2007/0183435 A1 | 8/2007 | Kettering et al. | |
| 2007/0198513 A1 | 8/2007 | Stelling et al. | |
| 2007/0234047 A1 | 10/2007 | Miyazawa | |
| 2007/0279244 A1 | 12/2007 | Haughawout et al. | |
| 2008/0104686 A1 | 5/2008 | Erickson | |
| 2008/0140278 A1 | 6/2008 | Breed | |
| 2008/0208853 A1 | 8/2008 | Vismans et al. | |
| 2009/0024312 A1 | 1/2009 | Brinkman | |
| 2009/0106560 A1 | 4/2009 | Chopart | |
| 2009/0112873 A1 | 4/2009 | Nanjangud Bhaskar et al. | |
| 2009/0138516 A1* | 5/2009 | Young et al. | 707/104.1 |
| 2009/0138517 A1 | 5/2009 | McLain et al. | |
| 2009/0138518 A1 | 5/2009 | Rodgers et al. | |
| 2009/0138873 A1 | 5/2009 | Beck et al. | |
| 2009/0138874 A1 | 5/2009 | Beck et al. | |
| 2009/0235071 A1 | 9/2009 | Bellur et al. | |
| 2010/0017578 A1 | 1/2010 | Mansson et al. | |
| 2011/0004763 A1* | 1/2011 | Sato et al. | 713/175 |
| 2014/0095866 A1* | 4/2014 | Grebennikov et al. | 713/156 |
| 2014/0181911 A1* | 6/2014 | Kula | 726/4 |

OTHER PUBLICATIONS

Extended European Search Report, dated May 23, 2014, regarding Application No. EP14157627.2, 7 pages.
International Search Report and Written Opinion, dated May 22, 2014, regarding Application No. PCT/US2014/016697, 10 pages.
Adelsbach et al., "Embedding Trust into Cars—Secure Software Delivery and Installation," Horst Gortz Institute for IT Security, Oct. 2005, pp. 1-15.
Ali et al., "Efficient Data Storage Mechanisms for DAP," Proceedings of the 23rd Digital Avionics Systems Conference (DASC '04), Oct. 2004, 7 pages.
De Boer et al., "Generic Remote Software Update for Vehicle ECUs Using a Telematics Device as a Gateway," Networked Vehicle, Advanced Microsystems for Automotive Applications 2005, May 2005, pp. 371-380.
Hungarian Written Opinion dated Feb. 2, 2012 regarding application 201002236-6, applicant The Boeing Company, 10 pages.
Kayton, "Avionics for Manned Spacecraft," IEEE Transactions on Aerospace and Electronci Systems, vol. 25, No. 6, Nov. 1989, pp. 786-827.
PCT search report dated Jan. 26, 2009 regarding international application PCT/US08/84824, applicant's reference 07-0737APCT, applicant The Boeing Company, 2 pages.
PCT search report dated May 22, 2009 regarding international application PCT/US08/84839, applicant's reference 07-0698PCT, applicant The Boeing Company, 3 pages.
Sampigethaya et al., "Information Management System for Ground Vehicles," U.S. Appl. No. 12/857,740, filed Aug. 17, 2010, 74 pages.
Kimberly, "Verification of Aircraft Information in Response to Compromised Digital Certificate," U.S. Appl. No. 13/888,747, filed May 7, 2013, 33 pages.

* cited by examiner

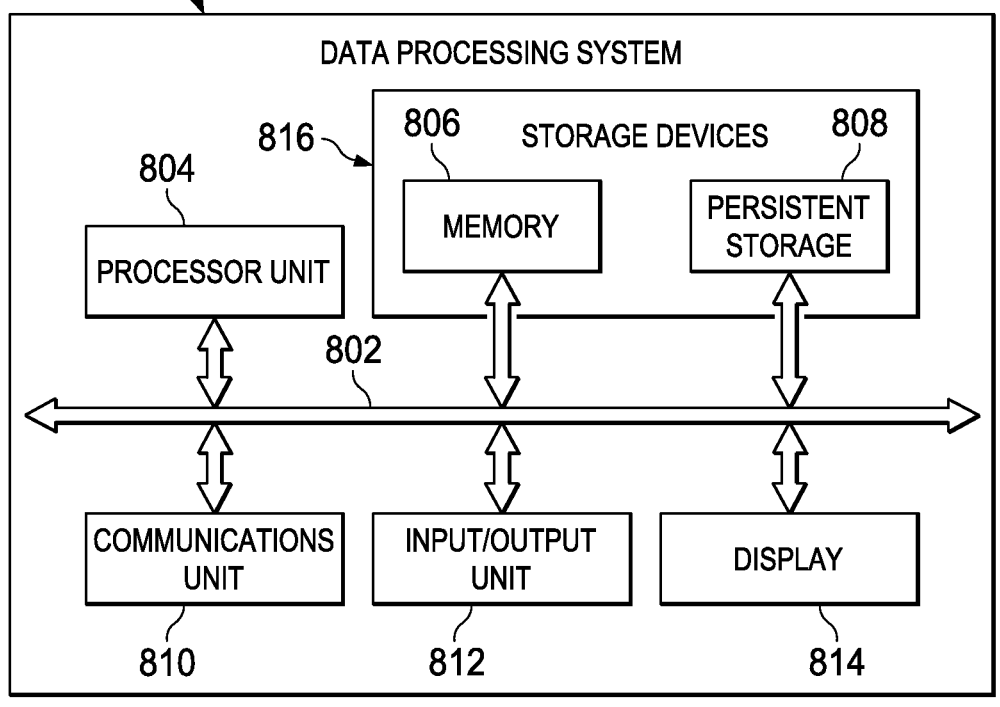
FIG. 8
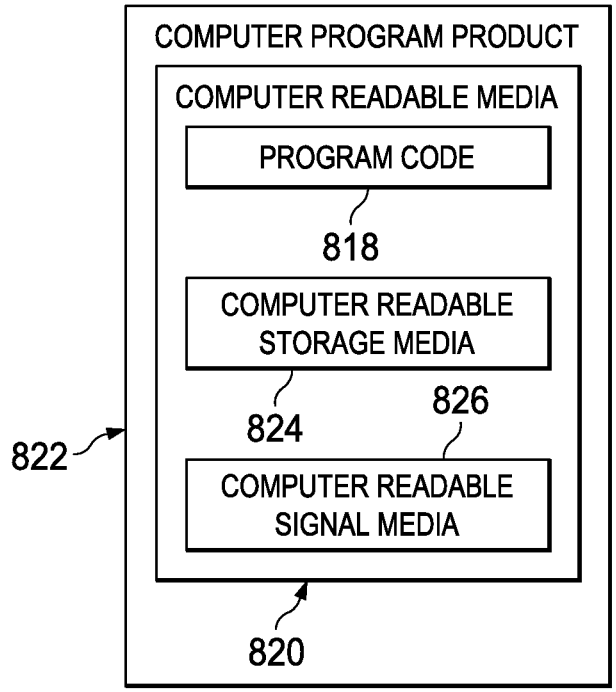

USE OF MULTIPLE DIGITAL SIGNATURES AND QUORUM RULES TO VERIFY AIRCRAFT INFORMATION

CROSS-REFERENCE TO RELATED APPLICATION

This application is related to the following patent application: entitled "Verification of Aircraft Information in Response to Compromised Digital Certificate," application Ser. No. 13/888,747; filed even date herewith, assigned to the same assignee, Notice of Allowance mailed Jun. 1, 2015, and incorporated herein by reference.

BACKGROUND INFORMATION

1. Field

The present disclosure relates generally to systems and methods for verifying the authenticity and integrity of information used on aircraft. More particularly, the present disclosure relates to the use of multiple digital signatures to verify the authenticity and integrity of information used on an aircraft.

2. Background

Modern aircraft are extremely complex. For example, an aircraft may have many types of electronic systems on-board. These systems are often in the form of line-replaceable units (LRUs). A line-replaceable unit is an item that can be removed and replaced from an aircraft. A line-replaceable unit is designed to be easily replaceable.

A line-replaceable unit may take on various forms. A line-replaceable unit on an aircraft may be, for example, without limitation, a flight management system, an autopilot, an in-flight entertainment system, a communications system, a navigation system, a flight controller, a flight recorder, a collision avoidance system, a system to support maintenance functions, or a system to support crew processes. The various line-replaceable units on an aircraft may be parts of an aircraft network data processing system.

Line-replaceable units may use software or programming to provide the logic or control for various operations and functions. Typically, software on an aircraft is treated as one or more separate parts or is combined with a hardware part and is unchangeable without changing the hardware part number. Aircraft software that is treated as an aircraft part may be referred to as a loadable aircraft software part or an aircraft software part. Aircraft software parts are parts of the configuration of an aircraft.

Aircraft operators are entities that operate aircraft. Aircraft operators also may be responsible for the maintenance and repair of aircraft. Examples of aircraft operators include airlines and military units. When an aircraft operator receives an aircraft, aircraft software parts may already be installed in the line-replaceable units on the aircraft.

An aircraft operator may also receive copies of loaded aircraft software parts in case the parts need to be reinstalled or reloaded into the line-replaceable units on the aircraft. Reloading of aircraft software parts may be required, for example, if a line-replaceable unit in which the software is used is replaced or repaired. Further, the aircraft operator also may receive updates to the aircraft software parts from time to time. These updates may include additional features not present in the currently-installed aircraft software parts and may be considered upgrades to one or more line-replaceable units. Specified procedures may be followed during loading of an aircraft software part on an aircraft such that the current configuration of the aircraft, including all of the aircraft software parts loaded on the aircraft, is known.

It may be desirable that only approved software and other data from trusted suppliers is used on an aircraft. Unapproved software and other data may include data that is corrupted, data that is infected with a virus, or other unapproved data. Unapproved software and other data may affect the operation of the aircraft in undesired ways.

Data processing networks may employ digital certificates in a public key infrastructure to ensure that only approved software and other data are used on the network. Such digital certificates also may be known as public key certificates or identity certificates. The digital certificates are issued by a certificate authority that is trusted by the network. The digital certificate identifies the source of the software or other data to the network in a manner that can be trusted. The network may use the digital certificate to determine whether or not the software or other data will be used on the network.

Current systems and methods for verifying the authenticity and integrity of software and other data for use on entirely ground-based computer networks may not be applied effectively to mobile systems, such as aircraft. The particular environment in which network data processing systems on aircraft are operated and maintained may make it difficult or impossible to use such current methods for validating software or other data for use on an aircraft network data processing system.

Accordingly, it would be desirable to have a method and apparatus that takes into account one or more of the issues discussed above as well as possibly other issues.

SUMMARY

An embodiment of the present disclosure provides a method for verifying data for use on an aircraft. A plurality of digital certificates associated with the data is received by a processor unit. The processor unit verifies the data for use on the aircraft using a selected number of the plurality of digital certificates.

Another embodiment of the present disclosure provides an apparatus comprising a data verification module. The data verification module is configured to receive a plurality of digital certificates associated with data for use on an aircraft and to verify the data for use on the aircraft using a selected number of the plurality of digital certificates.

Another embodiment of the present disclosure provides a method for verifying data for use on an aircraft. Data for use on the aircraft is received by a processor unit. The processor unit generates a plurality of digital certificates for the data. The data and the plurality of digital certificates are sent to the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

FIG. 8 is an illustration of a data processing system in accordance with an illustrative embodiment.

DETAILED DESCRIPTION

The different illustrative embodiments recognize and take into account a number of different considerations. "A number," as used herein with reference to items, means one or more items. For example, "a number of different considerations" means one or more different considerations.

The different illustrative embodiments recognize and take into account that current public key infrastructure systems may be structured around singular root certificate authority-derived certificates. The use of singular certificates may create a system where misconfiguration or attack can effectively cause the system to cease to operate.

The different illustrative embodiments also recognize and take into account that an operator of an aircraft may prefer certain certificate authorities and may not trust other certificate authorities. Therefore, it may be desirable to allow an aircraft operator to use certificates from certificate authorities that are acceptable to the operator to verify software and other data for use on aircraft operated by that operator.

The different illustrative embodiments also recognize and take into account that audit techniques may exist that may make it possible to discover the compromise of a root certificate authority. It may be desirable to take into account the known or suspected compromise of a certificate authority for the verification of software or other data for use on an aircraft.

Therefore, one or more of the illustrative embodiments provide a system and method for validating the authenticity and integrity of software and other data for use on an aircraft using a plurality of digital certificates from a plurality of certificate authorities. In accordance with illustrative embodiments, software or other data may be validated for use on the aircraft if a number of the plurality of certificates associated with the data that satisfies a quorum rule is determined to be valid. The rules defining the quorum required for validation may be selected in response to a determination that a specified certificate authority may have been compromised.

Figure 1:
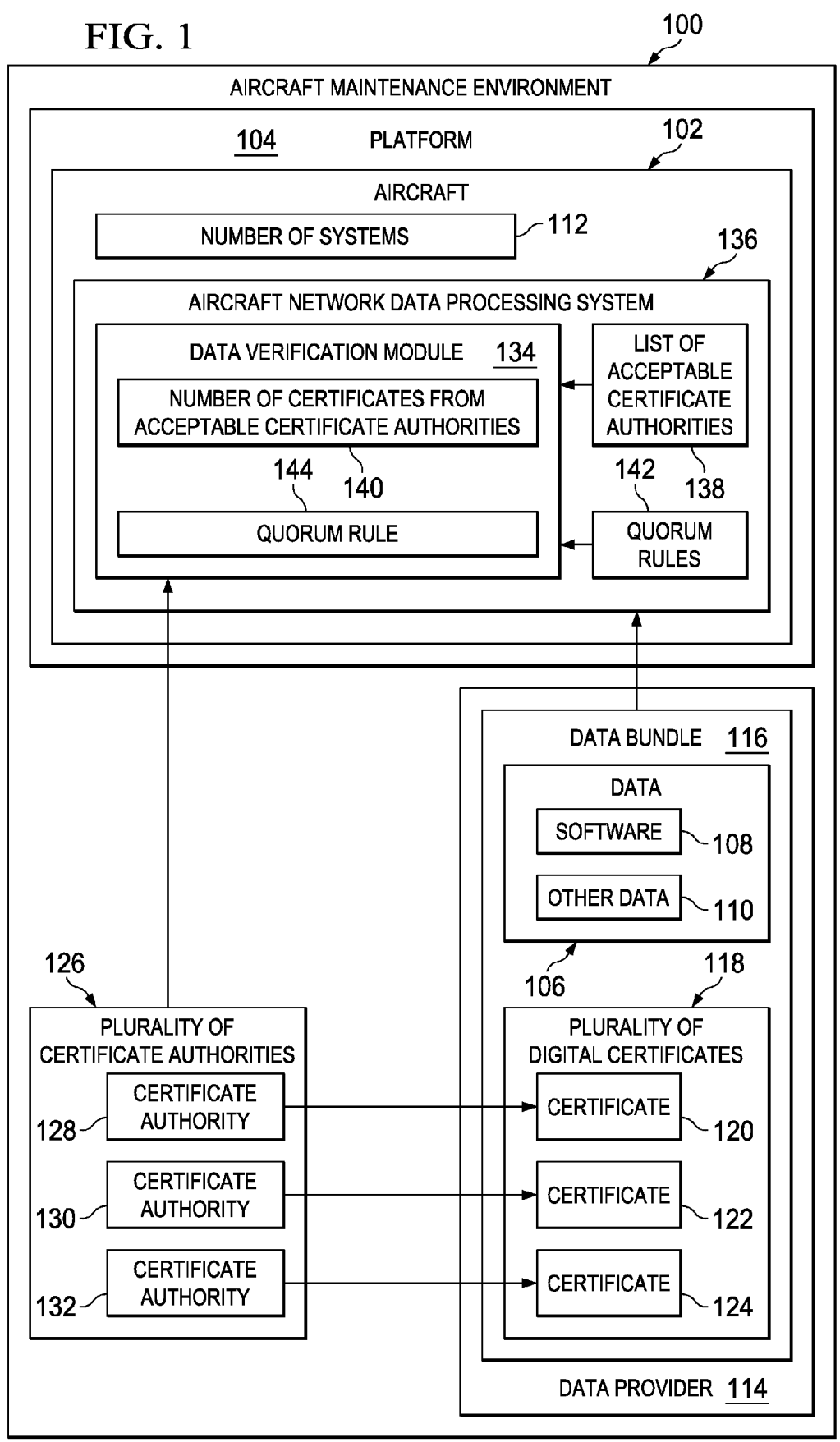
FIG. 1 is an illustration of a block diagram of an aircraft maintenance environment in accordance with an illustrative embodiment.

Turning now to FIG. 1, an illustration of a block diagram of an aircraft maintenance environment is depicted in accordance with an illustrative embodiment. In this example, aircraft maintenance environment 100 may be configured for the maintenance of aircraft 102.

Aircraft 102 may be any appropriate type of aircraft. For example, without limitation, aircraft 102 may be a commercial or private passenger aircraft, a cargo aircraft, a military or other government aircraft, or any other aircraft configured for any appropriate purpose or mission. Aircraft 102 may be a fixed wing, rotary wing, or lighter than air aircraft. Aircraft 102 may be a manned aircraft or an unmanned air vehicle.

Aircraft 102 is one example of platform 104 in which an illustrative embodiment may be implemented. Platform 104 may be a vehicle or other mobile structure. For example, without limitation, platform 104 may be an aerospace vehicle that is capable of traveling through the air, in space, or both. As another example, without limitation, platform 104 may be a vehicle that is capable of traveling on land, on the surface of water, underwater, or in any other medium or combination of media. In another illustrative embodiment, platform 104 may be a static system. For example, without limitation, platform 104 may be an industrial control system or other generally non-mobile system.

Aircraft 102 may use data 106 for operation of aircraft 102. For example, data 106 may include software 108, other data 110, or various combinations of data. For example, without limitation, software 108 may include aircraft software parts for use on line-replaceable units on aircraft 102. For example, without limitation, other data 110 may include mapping data or other data or combinations of data for use by aircraft 102.

Data 106 may be used by number of systems 112 on aircraft 102. For example, without limitation, number of systems 112 may include automatic pilot, flight management, communications, health management, other systems, or various combinations of systems for performing various functions on aircraft 102.

Data 106 may be provided by data provider 114. Data provider 114 may be any entity that has authority to provide data 106 for use on aircraft 102 or to load data 106 on aircraft 102. For example, without limitation, data provider 114 may include a software supplier, an aircraft maintenance entity, an aircraft operator, an aircraft manufacturer, or any other entity or combination of entities authorized to provide data 106 for use on aircraft 102. Data provider 114 may be any entity or combination of entities that is responsible for maintaining aircraft 102. Data provider 114 may or may not be the owner of aircraft 102. Data provider 114 may include an entity acting on behalf of the owner of aircraft 102 to provide data 106 for use on aircraft 102.

Data provider 114 may provide data 106 in data bundle 116 for loading on aircraft 102. For example, data bundle 116 may include data 106 along with plurality of digital certificates 118 for data 106. In this example, without limitation, plurality of digital certificates 118 may include certificate 120, certificate 122, and certificate 124. Plurality of digital certificates 118 may include any appropriate number of digital certificates. For example, plurality of digital certificates 118 may include two or more than three digital certificates.

Plurality of digital certificates 118 may be from plurality of certificate authorities 126. For example, certificate 120 may be from certificate authority 128. Certificate 122 may be from certificate authority 130. Certificate 124 may be from certificate authority 132.

Data verification module 134 may be configured to use plurality of digital certificates 118 to verify data 106 for use on aircraft 102. For example, data verification module 134 may be implemented in aircraft network data processing system 136 on aircraft 102.

Data verification module 134 may be configured to use list of acceptable certificate authorities 138 to identify number of certificates from acceptable certificate authorities 140 to use to verify data 106 for use on aircraft 102. The quantity of plurality of digital certificates 118 that must be determined to be valid in order for data 106 to be verified may be defined by quorum rules 142. Data verification module 134 may be configured to select quorum rule 144 from quorum rules 142 for the verification of data 106 based on number of systems 112 on which data 106 will be used, location of aircraft 102 when data 106 is loaded on aircraft 102, other factors, or various combinations of factors.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 2:
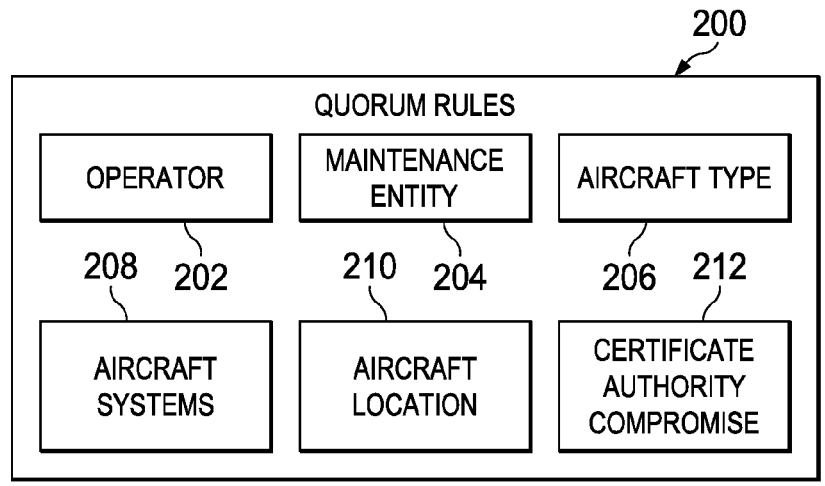
FIG. 2 is an illustration of a block diagram of quorum rules in accordance with an illustrative embodiment.

Turning now to FIG. 2, an illustration of a block diagram of quorum rules is depicted in accordance with an illustrative embodiment. In this example, quorum rules 200 may be an example of one implementation of quorum rules 142 in FIG. 1.

Quorum rules 200 may be defined for various characteristics or conditions of an aircraft. For example, without limitation, quorum rules 200 may be defined for operator 202 of an aircraft, for aircraft maintenance entity 204, for aircraft type 206, for aircraft systems 208 on which data will be used, for aircraft location 210, or for various other characteristics or combinations of characteristics of an aircraft. Specific quorum rules 200 may be defined for use in response to known or suspected certificate authority compromise 212.

Figure 3:
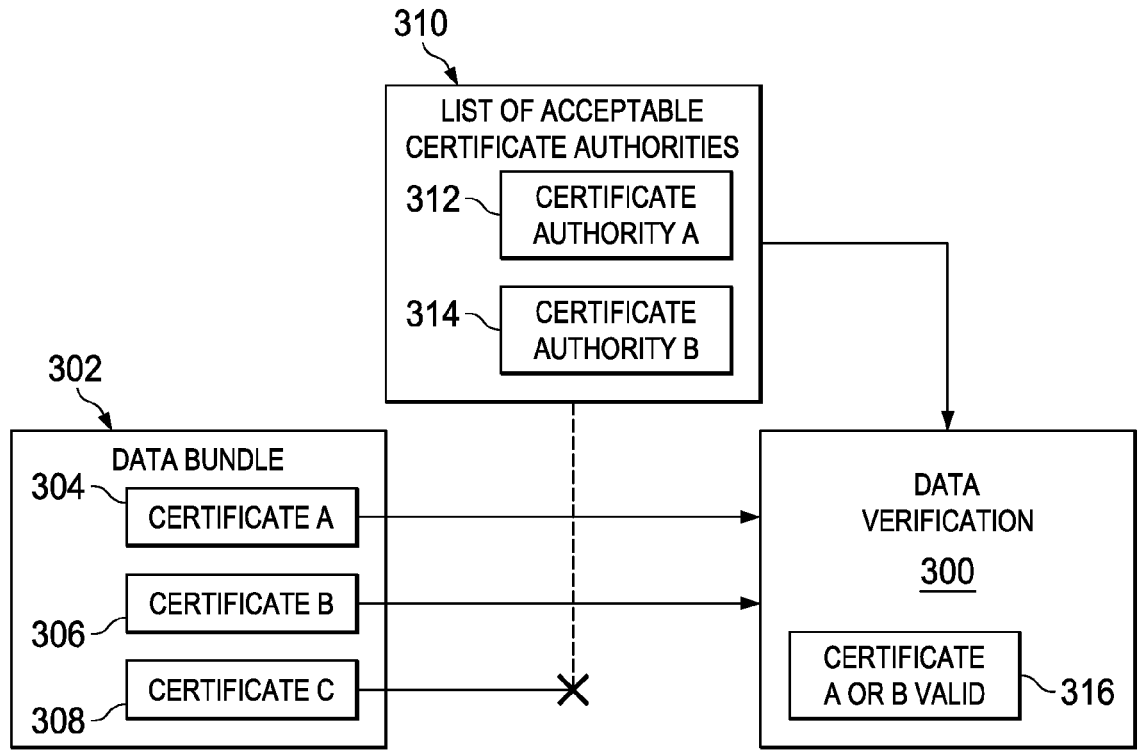
FIG. 3 is an illustration of a block diagram of data verification using a plurality of digital certificates and a list of acceptable certificate authorities in accordance with an illustrative embodiment.

Turning now to FIG. 3, an illustration of a block diagram of data verification using a plurality of digital certificates and a list of acceptable certificate authorities is depicted in accordance with an illustrative embodiment. For example, data verification 300 may be performed using data verification module 134 in FIG. 1.

In this example, data bundle 302 to be verified may include certificate A 304, certificate B 306, and certificate C 308. List of acceptable certificate authorities 310 may indicate that only certificates from certificate authority A 312 and certificate authority B 314 are acceptable to use for data verification 300. In this case, certificate C 308 is not from either certificate authority A 312 or certificate authority B 314. Therefore, certificate C 308 will not be used for data verification 300. In this example, data bundle 302 may be verified in response to a determination of certificate A or B valid 316.

Figure 4:
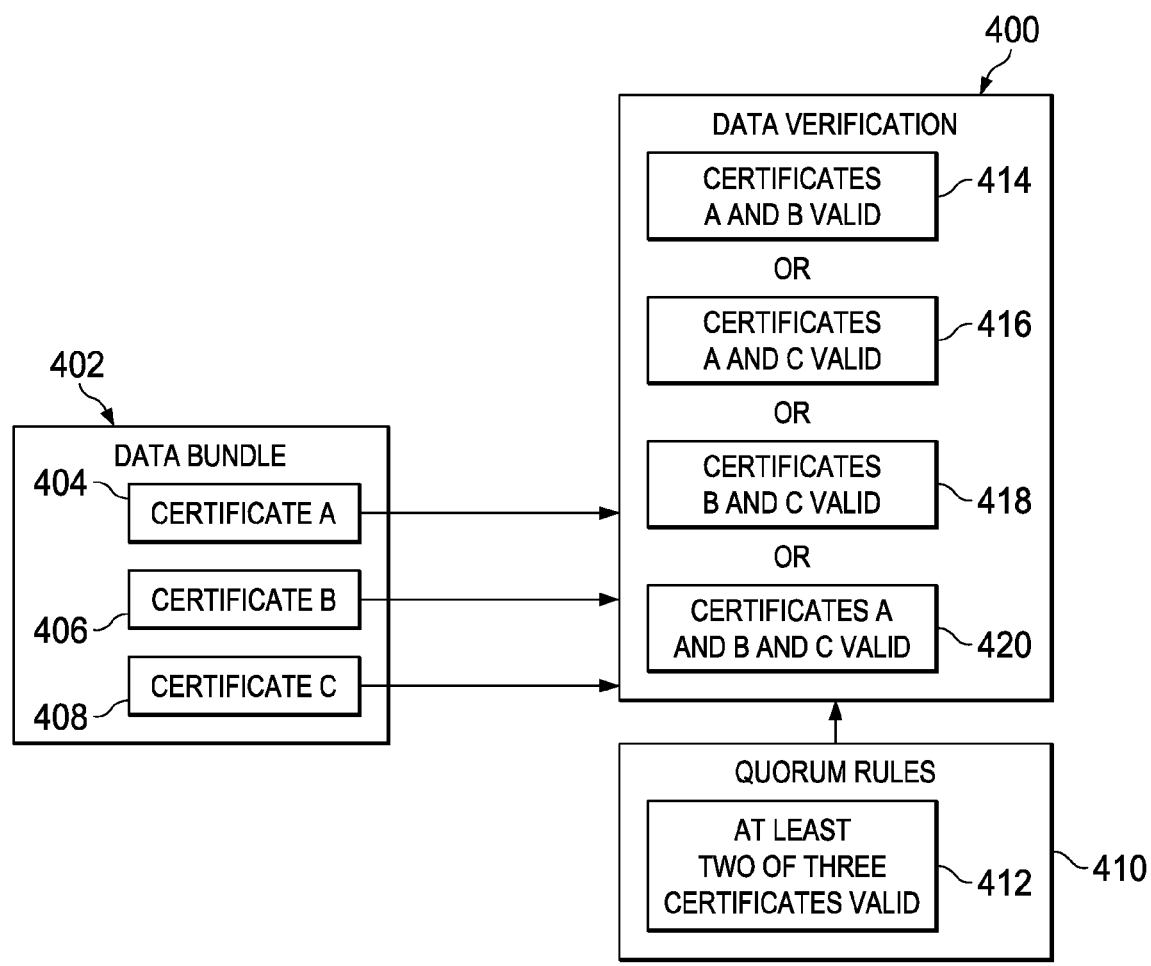
FIG. 4 is an illustration of a block diagram of data verification using a plurality of digital certificates and quorum rules in accordance with an illustrative embodiment.

Turning now to FIG. 4, an illustration of a block diagram of data verification using a plurality of digital certificates and quorum rules is depicted in accordance with an illustrative embodiment. For example, data verification 400 may be performed using data verification module 134 in FIG. 1.

In this example, data bundle 402 to be verified may include certificate A 404, certificate B 406, and certificate C 408. Quorum rules 410 may indicate that data bundle 402 may be verified if at least two of three certificates is valid 412. Therefore, in this example, data bundle 402 may be verified in response to a determination of certificates A and B valid 414, certificates A and C valid 416, certificates B and C valid 418, or certificates A and B and C valid 420.

Figure 5:
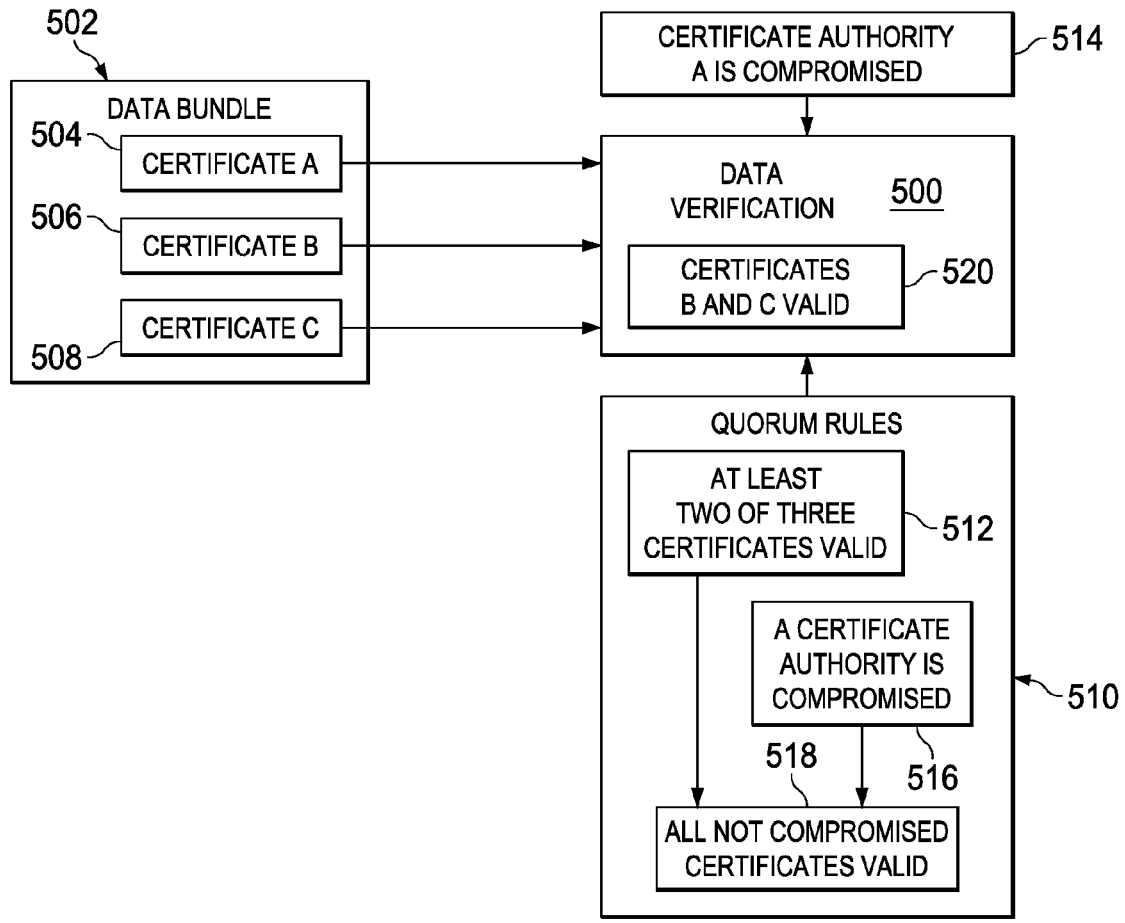
FIG. 5 is an illustration of a block diagram of data verification in response to a compromised certificate authority in accordance with an illustrative embodiment.

Turning now to FIG. 5, an illustration of a block diagram of data verification in response to a compromised certificate authority is depicted in accordance with an illustrative embodiment. For example, data verification 500 may be performed using data verification module 134 in FIG. 1.

In this example, data bundle 502 to be verified may include certificate A 504, certificate B 506, and certificate C 508. Quorum rules 510 may indicate that data bundle 502 may be verified if at least two of three certificates is valid 512. However, in this case, available information indicates that certificate authority A is compromised 514. Quorum rules 510 also indicate that if a certificate authority is compromised 516, then the appropriate quorum rule to use is changed from at least two of three certificates valid 512 to all not compromised valid 518. Therefore, in this example, data bundle 502 may be verified only in response to a determination of certificates B and C valid 520.

Figure 6:
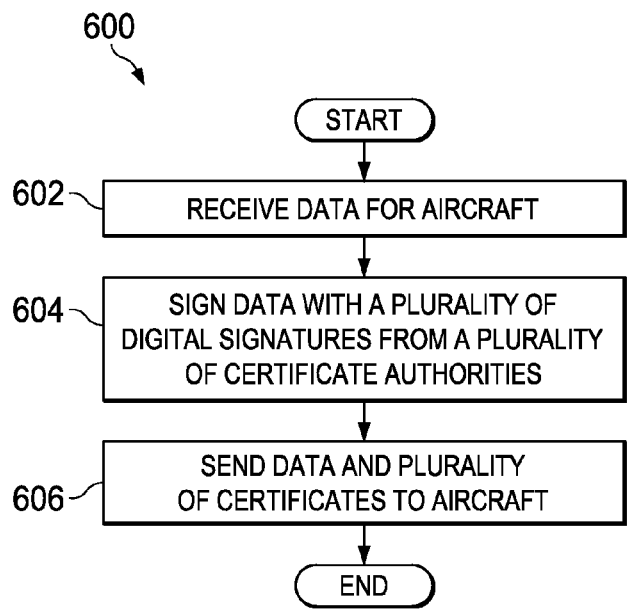
FIG. 6 is an illustration of a flowchart of a process for signing data for use on an aircraft in accordance with an illustrative embodiment.

Turning now to FIG. 6, an illustration of a flowchart of a process for signing data for use on an aircraft is depicted in accordance with an illustrative embodiment. For example, without limitation, process 600 may be performed by data provider 114 in FIG. 1.

Data for an aircraft may be received (operation 602). The data may be signed with a plurality of digital signatures from a plurality of certificate authorities (operation 604). The data and the plurality of certificates then may be sent to the aircraft (operation 606), with the process terminating thereafter.

Figure 7:
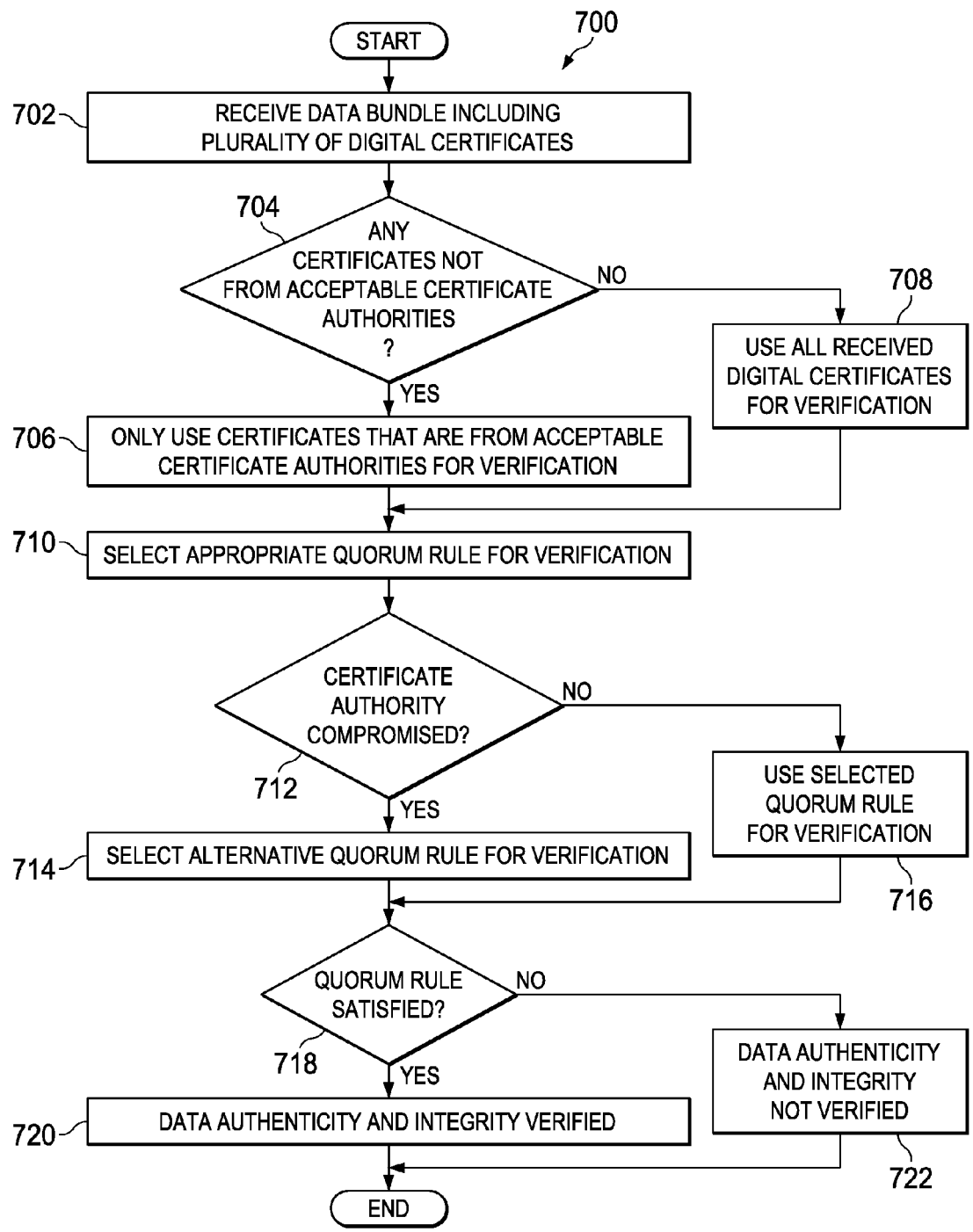
FIG. 7 is an illustration of a flowchart of a process for verifying data for use on an aircraft in accordance with an illustrative embodiment.

Turning now to FIG. 7, an illustration of a flowchart of a process for verifying data for use on an aircraft is depicted in accordance with an illustrative embodiment. In this example, process 700 may be performed by data verification module 134 in FIG. 1.

A data bundle including a plurality of digital certificates is received (operation 702). It may be determined whether any of the certificates are not from acceptable certificate authorities (operation 704). If it is determined that any of the certificates are not from acceptable certificate authorities, only the certificates that are from acceptable certificate authorities may be used for verification of the data bundle (operation 706). Otherwise, all of the received digital certificates may be used for verification (operation 708).

An appropriate quorum rule for verification may be selected (operation 710). It may be determined whether there is any indication that a certificate authority may have been compromised (operation 712). An alternative quorum rule may be selected for verification in response to a determination that a certificate authority may have been compromised (operation 714). Otherwise, the quorum rule selected in operation 710 may be used for verification (operation 716).

It then may be determined whether the selected quorum rule is satisfied (operation 718). If the selected quorum rule is satisfied, data authenticity and integrity may be considered to be verified (operation 720), with the process terminating thereafter. Otherwise, data authenticity and integrity may not be verified (operation 722), with the process terminating thereafter.

Turning now to FIG. 8, an illustration of a data processing system is depicted in accordance with an illustrative embodiment. In this example, data processing system 800 is an example of one implementation of a data processing system on aircraft network data processing system 136 in FIG. 1. Data processing system 800 is an example of one implementation of a data processing system on which data verification module 134 in FIG. 1 may be implemented.

In this illustrative example, data processing system 800 includes communications fabric 802. Communications fabric 802 provides communications between processor unit 804, memory 806, persistent storage 808, communications unit 810, input/output (I/O) unit 812, and display 814. Memory 806, persistent storage 808, communications unit 810, input/ output (I/O) unit 812, and display 814 are examples of resources accessible by processor unit 804 via communications fabric 802.

Processor unit 804 serves to run instructions for software that may be loaded into memory 806. Processor unit 804 may be a number of processors, a multi-processor core, or some other type of processor, depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information such as, for example, without limitation, data, program code in functional form, and other suitable information either on a temporary basis or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program instructions, program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, or any other suitable type of signal. These signals may be transmitted over communications links, such as wireless communications links, optical fiber cable, coaxial cable, a wire, or any other suitable type of communications link. In other words, the communications link or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code. As one example, data processing system 800 may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or transmit and receive data. Communications unit 810 may be, for example, a modem or a network adapter, two network adapters, or some combination thereof. Further, a memory may be, for example, memory 806, or a cache, such as found in an interface and memory controller hub that may be present in communications fabric 802.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for verifying data for use on an aircraft, comprising:
   receiving, by a processor unit disposed on one or more chips, a plurality of digital certificates associated with the data;
   selecting, from a selected number of the plurality of digital certificates, the selected number including a quorum rule selected from quorum rules that are based upon a system on the aircraft by which the data will be used and a location of the aircraft when the data is loaded into the aircraft, a quorum rule, from a number of quorum rules in the processor unit, for selecting a number of digital certificates from among the plurality of digital certificates; and
   verifying, as uncompromised, by the processor unit, the data for use on the aircraft using a selected number of the plurality of digital certificates, via determining which of the plurality of digital certificates are received from an acceptable certificate authority; and
   wherein the selected number of certificates is defined by the quorum rule, the quorum rule being further containing of one, or more, of:
   a quorum rule for an operator of an aircraft;
   a quorum rule for an aircraft maintenance entity;
   a quorum rule for an aircraft type;
   a quorum rule for an aircraft system on which data will be used;
   a quorum rule for the number of aircraft systems on which data will be used; and
   a quorum rule for use when a certificate authority is known to be, or suspected of being compromised.

2. The method of claim 1, wherein the plurality of digital certificates is from a plurality of certificate authorities and further comprising selecting the selected number of the plurality of digital certificates using a list of acceptable certificate authorities.

3. The method of claim 1, wherein verifying the data for use on the aircraft using the selected number of the plurality of digital certificates comprises determining whether at least a specified number of the selected number of the plurality of digital certificates is valid, via determining a specified digital authority as being compromised.

4. The method of claim 1, wherein the data comprises software for use on the aircraft.

5. The method of claim 1, such that an aircraft network data processing system on the aircraft comprises the processor unit.

6. An apparatus, comprising:
   a processor unit disposed on one or more chips comprising:
   a quorum rule selected, based upon a system on an aircraft by which data will be used and a location of the system when the data is loaded is loaded onto the system, from a number of quorum rules in the processor unit, wherein the quorum rules selects a number of digital certificates from among a plurality of digital certificates associated with the data; and
   a data verification module configured to receive the plurality of digital certificates and to verify, as uncompromised, the data based upon a selected number of the plurality of digital certificates being received from an acceptable certificate authority,
   the selected number of certificates being determined by a quorum rule selected from quorum rules based on at least two of:
   an aircraft system on with the data will be loaded;
   a number of aircraft systems on which the data will be used;
   a location of the aircraft when the data is loaded; and
   when a determination is made that a certificate authority is known to be, or is suspected of being compromised.

7. The apparatus of claim 6, wherein the plurality of digital certificates is from a plurality of certificate authorities and wherein the data verification module is further configured to select the selected number of the plurality of digital certificates using a list of acceptable certificate authorities.

8. The apparatus of claim 6, wherein the data verification module is configured to determine whether at least a specified number of the selected number of the plurality of digital certificates is valid.

9. The apparatus of claim 6, wherein the data comprises software for use on the aircraft.

10. The apparatus of claim 6, wherein the data verification module is implemented in an aircraft network data processing system on the aircraft.

11. A method for verifying data, for use on an aircraft, as being uncompromised, the method comprising a one or more processor units disposed on one or more chips:
- receiving the data for use on the aircraft;
- identifying a plurality of digital certificates for the data via determining which of the plurality of digital certificates are received from an acceptable certificate authority;
- selecting, from a selected number of the plurality of digital certificates, the selected number including a quorum rule selected from quorum rules that are based upon a system on the aircraft by which the data will be used and a location of the aircraft when the data is loaded is loaded onto the aircraft, a quorum rule, from a number of quorum rules in the processor unit, for selecting a number of digital certificates from among the plurality of the digital certificates; and
- the selected number of certificates being determined by a quorum rule selected from quorum rules based on at least two of:
- an aircraft system on with the data will be loaded;
- a number of aircraft systems on which the data will be used;
- a location of the aircraft when the data is loaded; and
- when a determination is made that a certificate authority is known to be, or is suspected of being compromised; and
- sending the data and the plurality of digital certificates to the aircraft.

12. The method of claim 11, wherein the plurality of digital certificates is from a plurality of certificate authorities.

13. The method of claim 11, wherein the data comprises software for use on the aircraft, and farther comprising determining the acceptable certificate authority via a list, on the aircraft, of acceptable certificate authorities.

14. The method of claim 11, further comprising:
- receiving the plurality of digital certificates by an aircraft network data processing system on the aircraft; and
- verifying, by the aircraft network data processing system, the data for use on the aircraft using a selected number of the plurality of digital certificates.

* * * * *